No. 781,816. PATENTED FEB. 7, 1905.
C. DE ESTEVE-LLATAS.
MANUFACTURE OF ARMOR PLATES.
APPLICATION FILED FEB. 4, 1903.

Fig. 3ª.

Fig. 4ª.

WITNESSES
C. J. Ashdown.
H. F. Cain.

INVENTOR
Candido de Esteve Llatas
per G. M. Hardingham
Attorney.

No. 781,816. Patented February 7, 1905.

UNITED STATES PATENT OFFICE.

CANDIDO DE ESTEVE-LLATAS, OF PARIS, FRANCE, ASSIGNOR TO THE ESTEVE STEEL COMPANY, LIMITED, OF WINDSOR ROAD, HACKNEY WICH, MIDDLESEX COUNTY, ENGLAND.

MANUFACTURE OF ARMOR-PLATES.

SPECIFICATION forming part of Letters Patent No. 781,816, dated February 7, 1905.

Application filed February 4, 1903. Serial No. 141,921.

*To all whom it may concern:*

Be it known that I, CANDIDO DE ESTEVE-LLATAS, a subject of the King of Spain, residing at 44 Rue de l'Avenir, Asnières, Paris, in the Republic of France, have invented certain new and useful Improvements in the Manufacture of Armor-Plates, of which the following is a specification.

This invention relates to the manufacture of armor-plates designed to present greater power of resistance to perforation by a projectile (in proportion to its weight) than hitherto obtainable, to dispense with the processes of cementation and tempering, and generally to simplify the manufacture.

Figure 3:
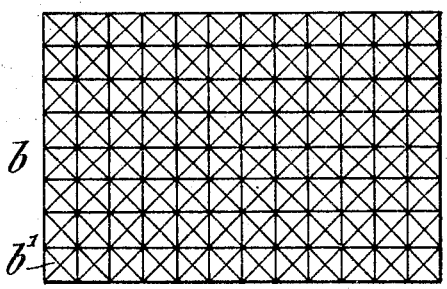
Figure 4:
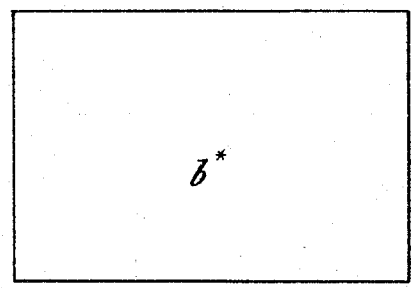
Figure 2:
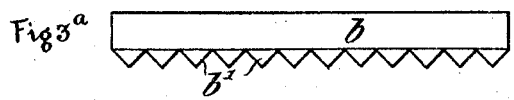
Figure 2:
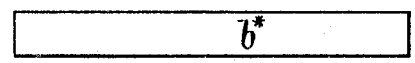
Figure 2:
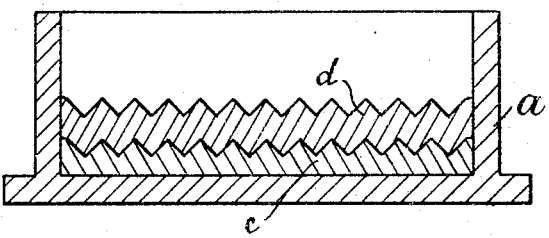
Figure 1:
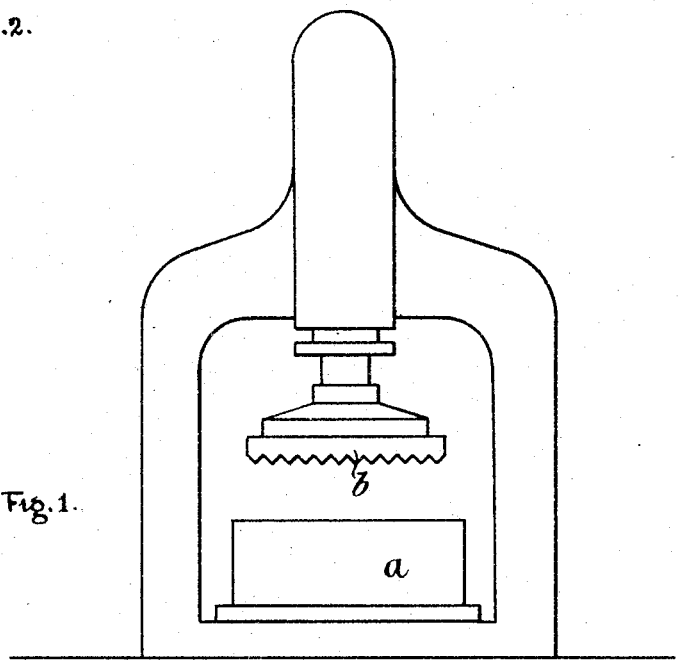

In the accompanying drawings, Figure 1 illustrates a hydraulic press adapted for use in the manufacture of armor-plates according to the present invention. Figs. 2, 3, $3^a$, 4, and $4^a$ illustrate details hereinafter more particularly referred to.

An armor-plate constructed according to this invention may consist of three, four, five, or any other convenient number of layers of steel of various powers of resistance welded together in the course of manufacture. Tempering the surface is dispensed with, it having been found that superficial tempering by imparting greater hardness, and therefore fragility, renders the plate more liable to rupture under the shock of a projectile. Uniformity of tempering is, moreover, seldom obtained, especially in the case of large surfaces.

In the manufacture of armor-plates according to the present invention steels prepared according to the specification to Letters Patent, dated December 14, 1897, No. 595,319, will be found most suitable, owing to their great weldability.

In order to produce an armor-plate comprising, for the sake of example, three layers of steel of various degrees of resistance, a mold $a$, adapted for the reception of molten steel and capable of withstanding considerable pressure, is employed. In forming, say, the outer layer $c$ steel of extreme hardness combined with great tenacity is poured into the mold to a depth sufficient to give the layer the required thickness. A steel suitable for this purpose would be one containing carbon, 1.150 per cent.; manganese, .125 per cent., and silicon .525 per cent. The metal having set, a cover-plate $b$, capable of easily passing into the mold $a$ and having its entire under surface studded with pyramoidal projections $b'$ or otherwise serrated, is then lowered upon it, and sufficient pressure is exerted to drive the projections into the surface of the layer of still viscid metal. The cover-plate $b$ is then raised, and at the moment of pouring the second layer $d$ the upper surface of the first layer $c$ is treated with plumbago diluted with water, this having the effect of reducing any oxid of iron found upon the first layer, owing to the latter coming while in a state of incandescence into contact with the atmosphere. Unless this oxid of iron, which is irreducible by heat, be got rid of a proper welding between the layers cannot be effected. As soon as the first layer $c$ has become sufficiently congealed—that is, so that only superficial liquefaction will take place upon the second layer $d$ being applied—the second layer, composed of steel possessing tenacity as its characteristics rather than hardness, is poured into the mold $a$ to the required depth and sufficient pressure exerted upon it, with the serrated cover-plate $b$, to effect welding between it and the first layer $c$ and to leave in the same way the impression of the points $b'$ of the cover-plate $b$ upon the surface of the second layer. A steel suitable for the second layer would be one containing carbon, .350 per cent.; manganese, .525 per cent., and silicon .125 per cent. The same mode of procedure is followed in applying a third layer, except that in the case where it is only intended to employ three layers a cover-plate $b^*$, having a plain under surface is substituted for that formed with a serrated surface. A steel suitable for the third layer would be one of medium hardness—as, for example, one containing carbon, .550 per cent.; manganese, .425 per cent., and silicon .225 per cent. The compound plate may now be reheated, taken to the rolling-mill, and rolled to the required dimensions. It will be obvious that the plates may also be made of other numbers of layers and both the order and the composition of the latter varied.

In a three-layer plate made as above described the hardest layer, usually arranged on the exterior, receives the shock of the projectile, and the greater part of the force of the latter is expended upon it. Should the projectile traverse this layer, it will be met by the second layer, composed of steel of an extreme tenacity, combined with hardness relatively great, and should the projectile also traverse this layer it will be met by the third layer, composed of steel of greater hardness than the second layer, but yet possessing relatively great tenacity.

What I claim as my invention, and desire to secure by Letters Patent, is—

The herein-described process of manufacturing compound armor-plates composed of several layers of steel of various powers of resistance; such process consisting in pouring molten metal to constitute the first layer into a mold and when set serrating its upper surface by applying under pressure a plate formed with pyramoidal or equivalent projections on its under surface, treating the serrated surface with a solution of plumbago and water, pouring in molten metal to constitute the next layer, serrating and treating the upper surface of this and of each succeeding layer (with the exception of the last) in a similar manner, substantially as set forth.

In testimony whereof I have signed my name to this specification in the presence of two subscribing witnesses.

CANDIDO DE ESTEVE-LLATAS.

Witnesses:
F. DE GARYOLLO,
STANLEY C. HARRIS.